United States Patent
Boo et al.

(10) Patent No.: US 10,942,689 B2
(45) Date of Patent: Mar. 9, 2021

(54) PULL PRINTING VIA ADDITIONAL SECURITY PROCESSES

(71) Applicant: HEWLETT-PACKARD DEVELOPMENT COMPANY, L.P., Spring, TX (US)

(72) Inventors: Deok Hee Boo, Pangyo (KR); A Ri Kim, Pangyo (KR); Jeong Hun Kim, Pangyo (KR); Sang Min Lee, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,890

(22) PCT Filed: Mar. 2, 2018

(86) PCT No.: PCT/KR2018/002533
§ 371 (c)(1),
(2) Date: Oct. 28, 2019

(87) PCT Pub. No.: WO2019/013422
PCT Pub. Date: Jan. 17, 2019

(65) Prior Publication Data
US 2020/0183628 A1    Jun. 11, 2020

(30) Foreign Application Priority Data
Jul. 14, 2017    (KR) .................. 10-2017-0089668

(51) Int. Cl.
*G06F 3/12*    (2006.01)

(52) U.S. Cl.
CPC .......... *G06F 3/1222* (2013.01); *G06F 3/1238* (2013.01); *G06F 3/1288* (2013.01)

(58) Field of Classification Search
CPC .... G06F 3/1222; G06F 3/1238; G06F 3/1288; G06F 21/00; G06F 3/1253; G06F 3/1204; G06F 21/608; G06F 2221/2113; H04N 1/00838; H04N 1/4406; H04N 1/4413; H04N 1/0023; H04N 1/00411; H04L 63/0853; H04L 63/08; H04L 63/0861; H04L 63/0876
See application file for complete search history.

(56) References Cited

U.S. PATENT DOCUMENTS

| | | | |
|---|---|---|---|
| 2009/0187758 A1 | 7/2009 | Fujii et al. | |
| 2014/0240746 A1* | 8/2014 | Ichikawa | H04N 1/4413 358/1.14 |
| 2014/0359746 A1* | 12/2014 | Tezuka | H04L 63/0853 726/9 |
| 2016/0212297 A1 | 7/2016 | Nagasawa | |
| 2017/0090832 A1* | 3/2017 | Ishibashi | G06F 3/1238 |
| 2017/0149873 A1* | 5/2017 | Jang | G06F 21/608 |

(Continued)

FOREIGN PATENT DOCUMENTS

JP    2016157334    9/2016

*Primary Examiner* — Iriana Cruz
(74) *Attorney, Agent, or Firm* — Trop Pruner & Hu, P.C.

(57) ABSTRACT

A pull printing server may include a communicator to receive a job list including user authentication information from an image forming apparatus, and a controller to determine at least one of the image forming apparatus or a user terminal as a job list display device by using an authentication level corresponding to the user authentication.

17 Claims, 10 Drawing Sheets

| AUTHENTICATION METHOD | AUTHENTICATION LEVEL | ADDITIONAL AUTHENTICATION INFORMATION |
|---|---|---|
| FINGERPRINT | LEVEL 1 | IRIS RECOGNITION |
| USER TERMINAL | LEVEL 2 | FINGERPRINT, IRIS RECOGNITION |
| ID CARD | LEVEL 3 | IRIS RECOGNITION, FINGERPRINT, USER TERMINAL |
| ID/PW ENTRIES | LEVEL 4 | IRIS RECOGNITION, FINGERPRINT, USER TERMINAL, ID CARD |

| JOB INFORMATION | SECURITY LEVEL | ADDITIONAL AUTHENTICATION INFORMATION |
|---|---|---|
| DOCUMENT 1 | LEVEL 1 | OMITTED |
| DOCUMENT 2 | LEVEL 2 | IRIS, FINGERPRINT, USER TERMINAL, ID CARD |
| DOCUMENT 3 | LEVEL 3 | FINGERPRINT, IRIS |
| DOCUMENT 4 | LEVEL 4 | FINGERPRINT, IRIS, USER TERMINAL |

(56) References Cited

U.S. PATENT DOCUMENTS

2017/0195307 A1* 7/2017 Jones-McFadden ........................ H04W 12/06
2017/0279974 A1* 9/2017 Mondo ................. G06F 3/1267

* cited by examiner

| AUTHENTICATION METHOD | AUTHENTICATION LEVEL | ADDITIONAL AUTHENTICATION INFORMATION |
|---|---|---|
| FINGERPRINT | LEVEL 1 | IRIS RECOGNITION |
| USER TERMINAL | LEVEL 2 | FINGERPRINT, IRIS RECOGNITION |
| ID CARD | LEVEL 3 | IRIS RECOGNITION, FINGERPRINT, USER TERMINAL |
| ID/PW ENTRIES | LEVEL 4 | IRIS RECOGNITION, FINGERPRINT, USER TERMINAL, ID CARD |
| JOB INFORMATION | SECURITY LEVEL | ADDITIONAL AUTHENTICATION INFORMATION |
| DOCUMENT 1 | LEVEL 1 | OMITTED |
| DOCUMENT 2 | LEVEL 2 | IRIS, FINGERPRINT, USER TERMINAL, ID CARD |
| DOCUMENT 3 | LEVEL 3 | FINGERPRINT, IRIS |
| DOCUMENT 4 | LEVEL 4 | FINGERPRINT, IRIS, USER TERMINAL |

… 
PULL PRINTING VIA ADDITIONAL SECURITY PROCESSES

BACKGROUND ART

Pull printing refers to a method whereby an image forming apparatus communicates with a pull printing server having stored therein a printing job, receives the printing job from the pull printing server, and performs the received printing job.

DISCLOSURE OF INVENTION

Solution to Problem

A pull printing server may include a communicator to receive a job list including user authentication information from an image forming apparatus, and a controller to determine at least one of the image forming apparatus or a user terminal as a job list display device by using an authentication level corresponding to the user authentication.

BRIEF DESCRIPTION OF DRAWINGS

These and/or other aspects will become apparent and more readily appreciated from the following description of the examples, taken in conjunction with the accompanying drawings in which.

BEST MODE FOR CARRYING OUT THE INVENTION

A pull printing server may include a communicator to receive a job list including user authentication information from an image forming apparatus, and a controller to determine at least one of the image forming apparatus or a user terminal as a job list display device by using an authentication level corresponding to the user authentication.

Mode for the Invention

Reference will now be made to examples, which are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

In the specification, when an element is "connected" to another element, the elements may not only be "directly connected", but may also be "electrically connected" via another element therebetween. Also, when a region "includes" an element, the region may further include another element instead of excluding the other element, unless otherwise differently stated.

In the specification, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes necessary to perform the image forming job.

Also, an "image forming apparatus" may denote any apparatus capable of performing an image forming job, such as a printer, a scanner, a fax machine, a multi-function printer (MFP), or a display apparatus.

Also, a "hard copy" may denote an operation of printing an image on a print medium, such as a paper, and a "soft copy" may denote an operation of printing an image on a display device, such as a television (TV) or a monitor.

Also, "content" may denote any type of data that is a target of an image forming job, such as a picture, an image, or a document file.

Also, "print data" may denote data having a format printable by a printer.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires. Also, a "manager" may denote a person who has authority to access all functions and a system of an image forming apparatus. A "manager" and a "user" may be the same person.

Figure 1:
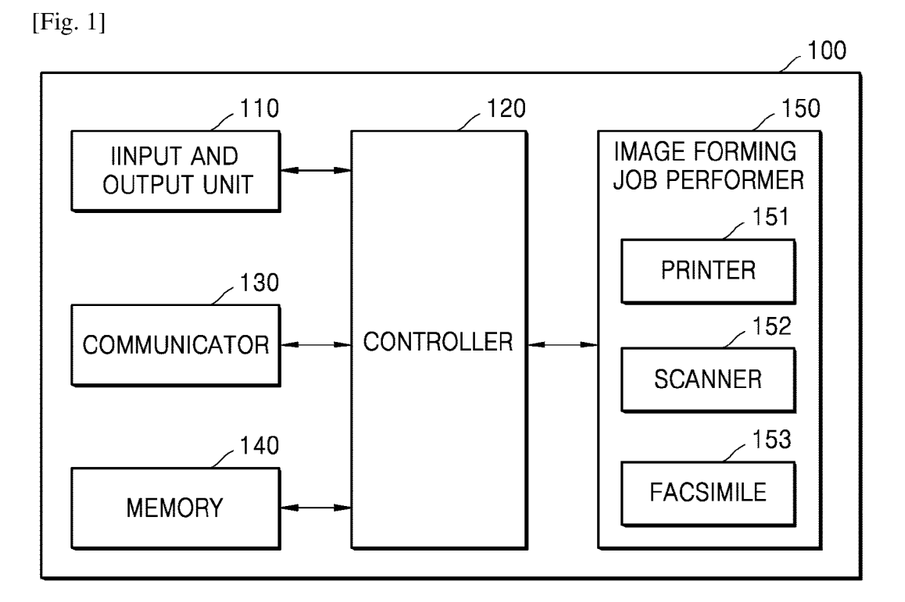
FIG. 1 is a block diagram of an image forming apparatus according to an example.

FIG. 1 is a block diagram of an image forming apparatus according to an example.

Referring to FIG. 1, an image forming apparatus 100 may include an input and output unit 110, a controller 120, a communicator 130, a memory 140, and an image forming job performer 150. Also, although not illustrated in FIG. 1, the image forming apparatus 100 may further include a power supplier for supplying power to each component of the image forming apparatus 100.

The input and output unit 110 may include an input unit for receiving, from a user, an input for performing an image forming job, and an output unit for displaying information, such as a result of performing an image forming job or a state of the image forming apparatus 100. For example, the input and output unit 110 may include an operation panel for receiving a user input and a display panel for displaying a screen.

The input unit may include at least one device for receiving various types of user inputs, such as a keyboard, a physical button, a touch screen, a camera, a microphone, or the like. Also, the output unit may include, for example, a display panel, a speaker, or the like. However, examples are not limited thereto, and the input and output unit 110 may include at least one device supporting various inputs and outputs.

The controller 120 controls operations of the image forming apparatus 100, and may include a processor, such as a central processing unit (CPU). The controller 120 may control other components included in the image forming apparatus 100 such that an operation corresponding to a user input received through the input and output unit 110 is performed.

For example, the controller 120 may execute a program stored in the memory 140, read a file stored in the memory 140, store a new file in the memory 140, or the like.

The communicator 130 may communicate with another device or a network in a wired or wireless manner. Accordingly, the communicator 130 may include a communication module supporting at least one of various wired and wireless communication methods. For example, the communication module may be in a form of a chipset or may be a sticker or a barcode (for example, a sticker including a near field communication (NFC) tag) including information necessary for communication.

Wireless communication may include, for example, at least one of wireless fidelity (Wi-Fi), Wi-Fi direct, Bluetooth, ultra wideband (UWB), NFC, or the like. Wired communication may include, for example, at least one of universal serial bus (USB), high definition multimedia interface (HDMI), or the like.

The communicator 130 may be connected to an external apparatus (e.g., a user terminal) provided outside the image forming apparatus 100 to transmit and receive a signal or data to and from the external apparatus.

Figure 2:
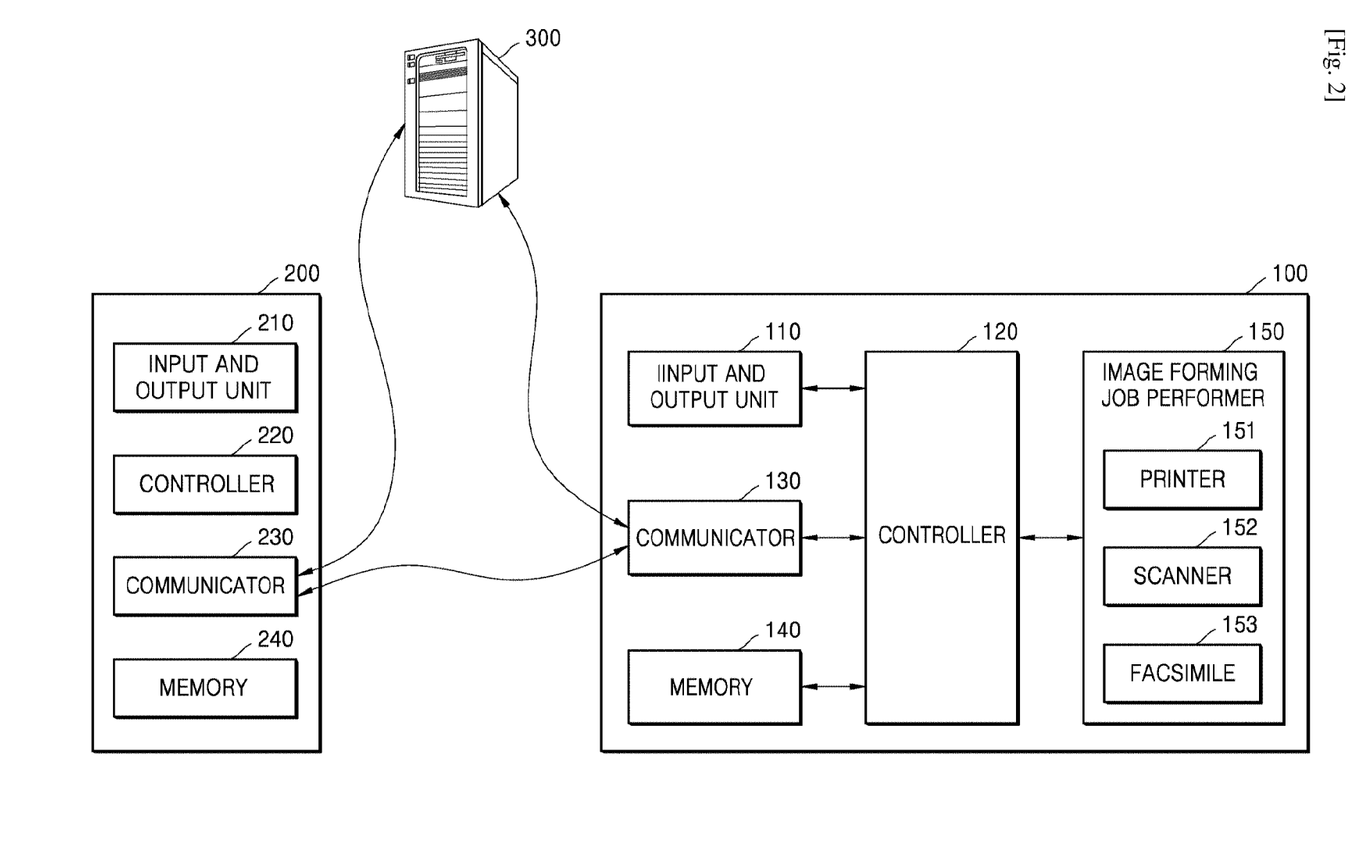
FIG. 2 is a diagram showing an image forming apparatus connected to a user terminal or a server according to an example.

FIG. 2 is a diagram showing that an image forming apparatus is connected to a user terminal or a server according to an example.

Referring to FIG. 2, the image forming apparatus 100 may be connected to an external apparatus (e.g., a user terminal 200) and may be connected to a server 300 through the communicator 130. The communicator 130 may transmit a signal or data received from the user terminal 200 to the controller 120, or transmit a signal or data generated by the controller 120 to the user terminal 200. For example, when the communicator 130 receives a print command signal or print data from the user terminal 200, the controller 120 may output the print data through a printer 151.

As shown in FIG. 2, the user terminal 200 may include an input and output unit 210, a controller 220, a communicator 230, and a memory 240.

The controller 220 may control an image forming job by executing a program stored in the memory 240 and transmitting a signal or data generated as a result of executing the program to the image forming apparatus 100 through the communicator 230.

Referring back to FIG. 1, the various types of data, such as a file or a program like an application, may be installed and stored in the memory 140. The controller 120 may access the data stored in the memory 140 to use the data, or may store new data in the memory 140. Also, the controller 120 may execute a program installed in the memory 140 and may install a program received from an external source through the communicator 130 in the memory 140.

The image forming job performer 150 may perform an image forming job, such as copying, printing, scanning, or faxing.

Referring to FIG. 1, the image forming job performer 150 includes the printer 151, a scanner 152, and a facsimile 153, but as occasion demands, the image forming job 150 may include some of them or may further include a component for performing another type of image forming job.

The printer 151 may form an image on a recording medium via any one of various printing methods, such as an electrophotography method, an inkjet method, a thermal transfer method, and a thermal method.

The scanner 152 may irradiate light onto paper and receive light reflected from the paper to read an image recorded on the paper. Examples of an image sensor for reading an image from paper include a charge-coupled device (CCD) and a contact type image sensor (CIS). The scanner 152 may have a flatbed structure in which paper is located at a fixed location and an image sensor moves to read an image, a document feed structure in which an image sensor is located at a fixed location and paper is transferred, or a combination structure thereof.

The facsimile 153 may share a component for scanning an image with the scanner 152, share a component for printing a received file with the printer 151, transmit a scan file to a destination, or receive a file from an external source.

Figure 3:
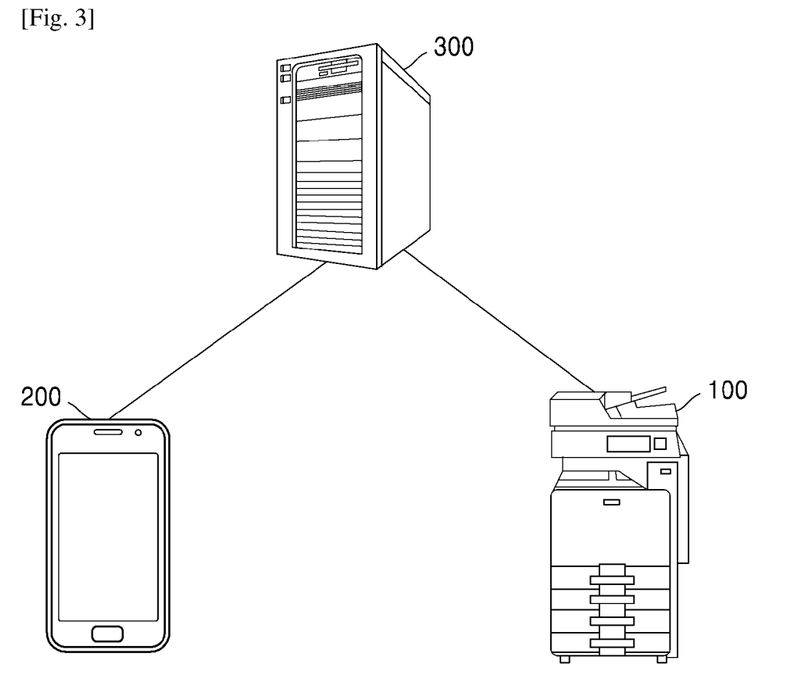
FIG. 3 is a diagram showing a pull printing environment using a pull printing server according to an example.

FIG. 3 is a diagram showing a pull printing environment using a pull printing server according to an example.

Referring to FIG. 3, a pull printing environment including the image forming apparatus 100, a user terminal 200, and a pull printing server 300 is shown. The pull printing environment may include one or more image forming apparatuses 100, one or more user terminals 200, and the pull printing server 300, and the one or more user terminals 200 and the one or more image forming apparatuses 100 may be connected to the pull printing server 300.

The user terminal 200 may be connected to the pull printing server 300 via a wireless access point (AP). Alternatively, the user terminal 200 may be connected to a cloud server (not shown) and perform pull printing.

Referring to FIG. 3, the pull printing server 300 may register the image forming apparatus 100 that supports pull printing and manage device information about the image forming apparatus 100. The pull printing server 300 may register a plurality of image forming apparatuses and manage device information thereof. The pull printing server 300 may request registration of updated device information about the image forming apparatuses 100 registered to the pull printing server 300 to perform pull printing.

The user terminal 200 may access the pull printing server 300 to transmit user authentication information to the pull printing server 300. Furthermore, the user terminal 200 may access the image forming apparatus 100 via the pull printing server 300 and obtain device information, such as a MAC address of the image forming apparatus 100. For example, a user may install and execute an application supporting pull printing on the user terminal 200, input user information, such as an identification (ID) and a password (PW) of the user to be authenticated in the pull printing server 300, and obtain device information, such as a MAC address, by performing NFC tagging on the image forming apparatus 100, scanning a quick response (QR) code at the image forming apparatus 100, or wirelessly accessing the image forming apparatus 100 (e.g., via Bluetooth Low Energy (BLE)). Alternatively, the user may directly input device information about the image forming apparatus 100 to the application executed on the user terminal 200. When device information about the image forming apparatus 100 is input to the user terminal 200, the user terminal 200 may transmit a login request including the device information about the image forming apparatus 100 and user information to the pull printing server 300 as an application supporting pull printing is executed.

The pull printing server 300 may receive the login request including the device information about the image forming apparatus 100 and the user information from the user terminal 200.

The pull printing server 300 may receive a job list request including user authentication information from the image forming apparatus 100. The pull printing server 300 may determine a pre-set job list display device according to the user authentication information.

A job list display device may be mapped to user authentication information. User authentication information may be determined according to how a user enters user identification information to the image forming apparatus 100. For example, user authentication information may include information about iris recognition, facial recognition, fingerprint recognition, ID/PW entries, ID card tagging, employee card tagging, mobile terminal tagging, etc. The pull printing server 300 may map a job list display device in advance according to user authentication information.

The pull printing server 300 may determine either the user terminal 200 or the image forming apparatus 100 as a job list display device based on user authentication information. The pull printing server 300 may transmit a job list to the determined job list display device. As a result, the pull printing server 300 may transmit a job list to the job list display device, such that names of jobs included in the job list and information about the jobs are not exposed. In an example, the job list display device is a highly reliable device.

Figure 4:
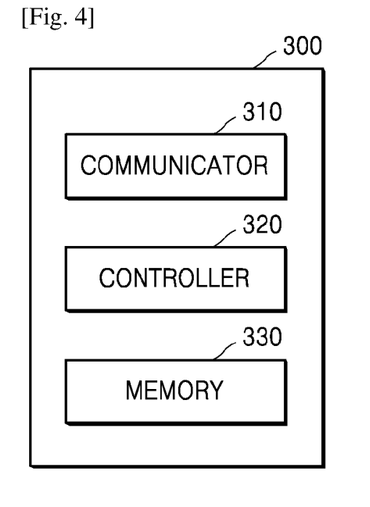
FIG. 4 is a diagram showing a configuration of a pull printing server according to an example.

FIG. 4 is a diagram showing a configuration of a pull printing server according to an example.

Referring to FIG. 4, the pull printing server 300 may include a communicator 310, a controller 320, and a memory 330.

The communicator 310 may perform communication with at least one user terminal, at least one server, at least one image forming apparatus, or at least one network via a wired or wireless connection. To this end, the communicator 310 may include a communication module that supports at least one of various wired and wireless communication protocols. For example, the communication module may be in the form of a chipset or may be a sticker/bar code that includes information necessary for communication (e.g., a sticker including an NFC tag).

Wireless communication protocols may include at least one of, for example, Wi-Fi, Wi-Fi Direct, Bluetooth, UWB, NFC, or the like. Wired communication protocols may include at least one of, for example, USB HDMI, or the like.

The communicator 310 may transmit signals or data received from the image forming apparatus 100 or the user terminal 200 to the controller 320 or transmit signals or data generated by the controller 320 to the image forming apparatus 100 or the user terminal 200. For example, when the communicator 310 receives a job selection request and a print command from the user terminal 200, the controller 320 may transmit print data to the image forming apparatus 100.

The controller 320 may control an operation of the pull printing server 300 and may include at least one processor, such as a CPU or the like. The controller 320 may include at least one specialized processor corresponding to each function or may be a single integrated processor.

For example, the controller 320 may execute a program stored in the memory 330, read data or a file stored in the memory 330, store a new file in the memory 330, or the like.

The controller 320 may determine either the image forming apparatus 100 or the user terminal 200 as a job list display device by using an authentication level corresponding to user authentication information. The controller 320 may control the pull printing server 300 to transmit a job list to the determined job list display device.

The controller 320 may determine additional authentication information based on a security level set with respect to a job and user authentication information. An authentication level of additional authentication information is equal to or higher than that of the user authentication information. Additional authentication information is information additionally requested to perform a print job.

Various types of data, such as programs like applications and files, may be installed and stored in the memory 330. The memory 330 may store information, such as print data input via a user input device (e.g., a user PC, a user terminal, etc.), a security level of a print job, user identification information, user authentication information, or the like.

Figure 5:
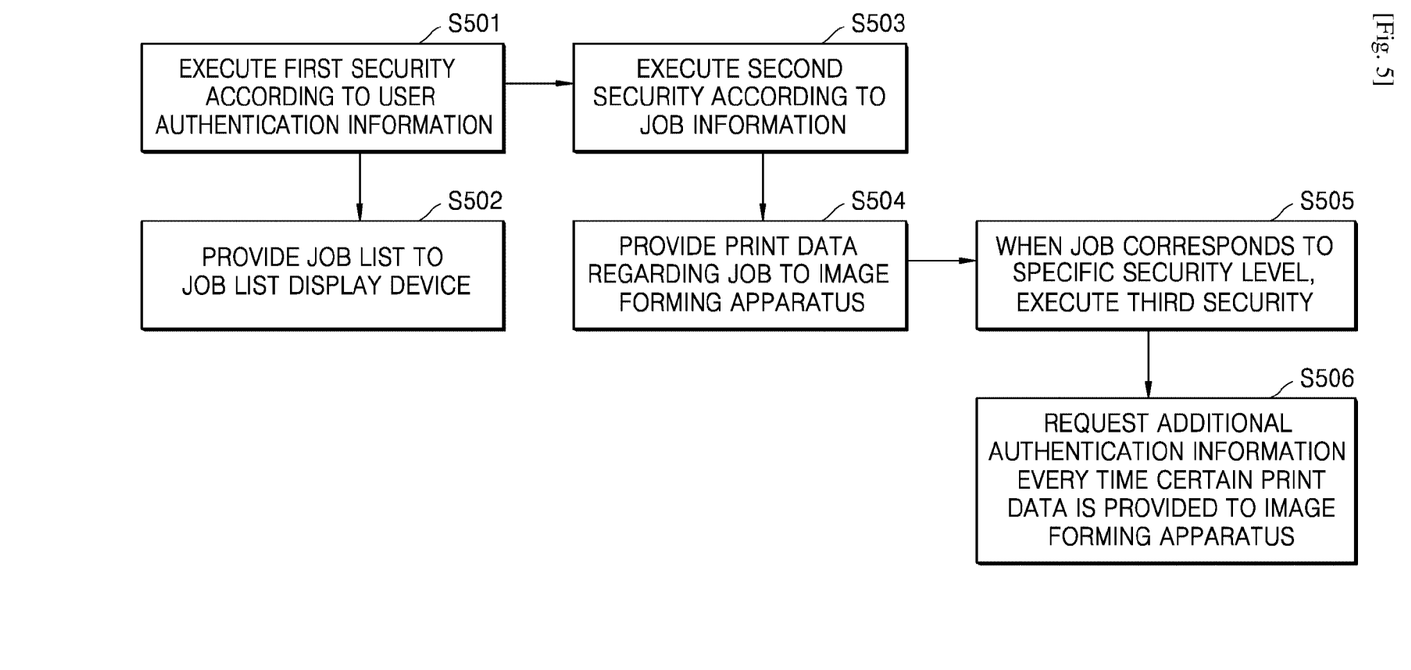
FIG. 5 is a diagram showing a pull printing server performing a security job in a pull printing system using the pull printing server according to an example.

FIG. 5 is a diagram showing a pull printing server performing a security job in a pull printing system using the pull printing server according to an example.

Referring to FIG. 5, a pull printing method using a pull printing server may improve the security of a print job by performing one or more security operations (i.e., security jobs). According to an example, the pull printing server 300 may perform a plurality of security jobs for one print job.

According to an example, a first security operation may include a security job necessary to provide a job list. In operation S501, the pull printing server 300 may receive a job list request including user authentication information via the image forming apparatus 100. For example, the pull printing server 300 may receive a job list request including user authentication information such as a user ID and a PW input via the image forming apparatus 100. The pull printing server 300 may determine a job list display device corresponding to the user authentication information. According to an example, the pull printing server 300 may map and store a job list display device per user authentication information. The pull printing server 300 may determine a job list display device that is mapped to user authentication information. For example, the pull printing server 300 may determine the user terminal 200 as the job list display device corresponding to the user ID and the PW included in the user authentication information.

In operation S502, the pull printing server 300 may provide a job list to the determined job list display device. For example, when the user terminal 200 is determined as the job list display device, the pull printing server 300 may not transmit the job list to the image forming apparatus 100 and transmit the job list only to the user terminal 200. Therefore, the job list is not displayed on a display of the image forming apparatus 100, thereby preventing exposure of the job list. In this case, even if a user using the image forming apparatus 100 does not log out after a print job is finished, leakage of the job list may be prevented.

According to an example, a second security operation may include a security job necessary to print a job selected from a job list. In operation S503, the pull printing server 300 may request additional authentication information to the image forming apparatus 100 or the user terminal 200 according to a security level of a job selected from the job list. The pull printing server 300 may receive a print request regarding any one job selected from the job list from the job list display device. The pull printing server 300 may check a security level set with respect to the selected job. The pull printing server 300 may perform an additional authentication operation based on the security level set with respect to the selected job.

According to an example, the pull printing server 300 may omit an additional authentication operation based on a security level set with respect to a job. For example, a security level from 1 to 5 may be set and, when the security level is level 1, the pull printing server 300 may be configured to omit an additional authentication operation. When the security level of a job selected via the job list display device is level 1, the pull printing server 300 may transmit print data regarding the job to the image forming apparatus 100 without an additional authentication operation. In another example, when the security level of the job is level 3, the pull printing server 300 may request additional authentication information corresponding to level 3.

In operation S504, the pull printing server 300 may authenticate the additional authentication information, and provide print data regarding the job to the image forming apparatus 100.

According to an example, a third security operation may include a security job additionally necessary when a selected job is set to a particular security level. In operation S505, the pull printing server 300 may execute the third security operation when a job selected from the job list corresponds to a particular security level. The pull printing server 300 may re-request additional authentication information when a job corresponds to a particular security level. The additional authentication information for the third security operation may be identical to or different from the additional authentication information about the second security operation.

In operation S506, the pull printing server 300 may request additional authentication information every time the image forming apparatus provides certain print data for a job. The certain print data may refer to a certain pre-set job amount, e.g., a certain number of pages to print, a certain amount of print data, etc.

Figure 6:
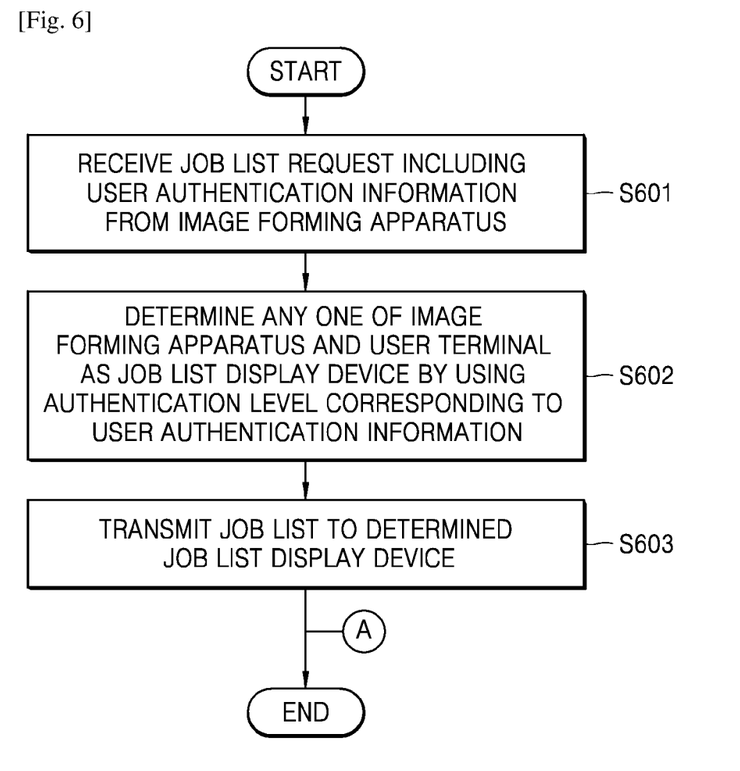
FIG. 6 is a flowchart of a pull printing method using a pull printing server according to an example.

FIG. 6 is a flowchart of a pull printing method using a pull printing server according to an example.

Referring to FIG. 6, the pull printing server 300 may receive a job list request including user authentication information from the image forming apparatus 100 in operation S601. The job list may refer to a list of at least one job stored in the pull printing server 300. A security level may be set with respect to each of the at least one job included in the job list. The pull printing server 300 may extract a job corresponding to user authentication information from a memory. The pull printing server 300 may generate a job list including jobs corresponding to user authentication information.

In operation S602, the pull printing server 300 may determine either the image forming apparatus 100 or the user terminal 200 as a job list display device by using an authentication level corresponding to the user authentication information.

According to an example, the pull printing server 300 may determine the job list display device based on a pre-set job list display device matching table. For example, when the user authentication information is an input based on fingerprint recognition, a job list display device corresponding to the fingerprint recognition may be determined by using the job list display device matching table. The pull printing server 300 may determine the image forming apparatus 100 as the job list display device when the job list display device determined by using the job list display device matching table is the image forming apparatus 100.

In operation S603, the pull printing server 300 may transmit a job list to the determined job list display device. For example, the pull printing server 300 may transmit a job list corresponding to user authentication information to the image forming apparatus 100.

Figure 7:
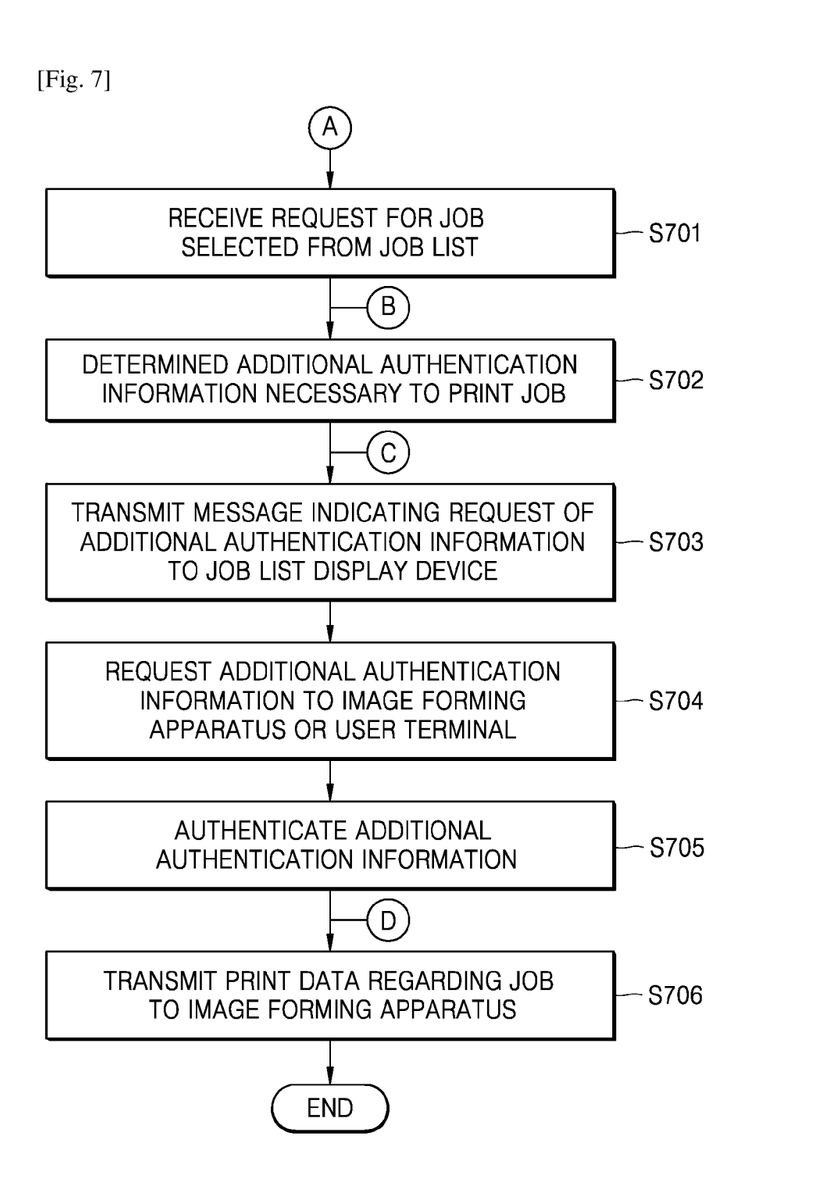
FIG. 7 is a flowchart showing an operation for requesting additional authentication information according to a security level of a job in a pull printing method using a pull printing server according to an example.

FIG. 7 is a flowchart showing an operation for requesting additional authentication information according to a security level of a job in a pull printing method using a pull printing server according to an example.

Referring FIG. 7, the pull printing server 300 may receive a request for a job selected from a job list from a job display device in operation S701. For example, the user terminal 200 may receive a job list from the pull printing server 300 and display the job list on a display. The user terminal 200 may select a job from the job list and transmit a request for the selected job to the pull printing server 300.

In operation S702, the pull printing server 300 may determine additional authentication information necessary to print the job. The pull printing server 300 may check a security level set with respect to the job selected by a user. The pull printing server 300 may determine additional authentication information corresponding to the security level set with respect to the job. For example, when a security level set with respect to a job A is level 3, additional authentication information corresponding to level 3 may be determined. An example process for determining additional authentication information will be described below with reference to FIG. 8.

In operation S703, the pull printing server 300 may transmit a message informing a request for additional authentication information to the job list display device. The pull printing server 300 may transmit a message indicating that additional authentication information is necessary to the image forming apparatus 100 or the user terminal 200. The image forming apparatus 100 or the user terminal 200 may display a message requesting additional authentication information on a display thereof.

In operation S704, the pull printing server 300 may request additional authentication information to the image forming apparatus 100 or the user terminal 200. The pull printing server 300 may request additional authentication information to a device capable of obtaining determined additional authentication information. For example, the pull printing server 300 may request additional authentication information to the image forming apparatus 100 when the additional authentication information is a fingerprint input via the image forming apparatus 100.

In operation S705, the pull printing server 300 may authenticate additional authentication information received from the image forming apparatus 100 or the user terminal 200. The pull printing server 300 may determine whether the received additional authentication information matches previously registered additional authentication information.

In operation S706, the pull printing server 300 may transmit print data regarding the job to the image forming apparatus 100 when authentication of the additional authentication information is completed.

Figure 8:
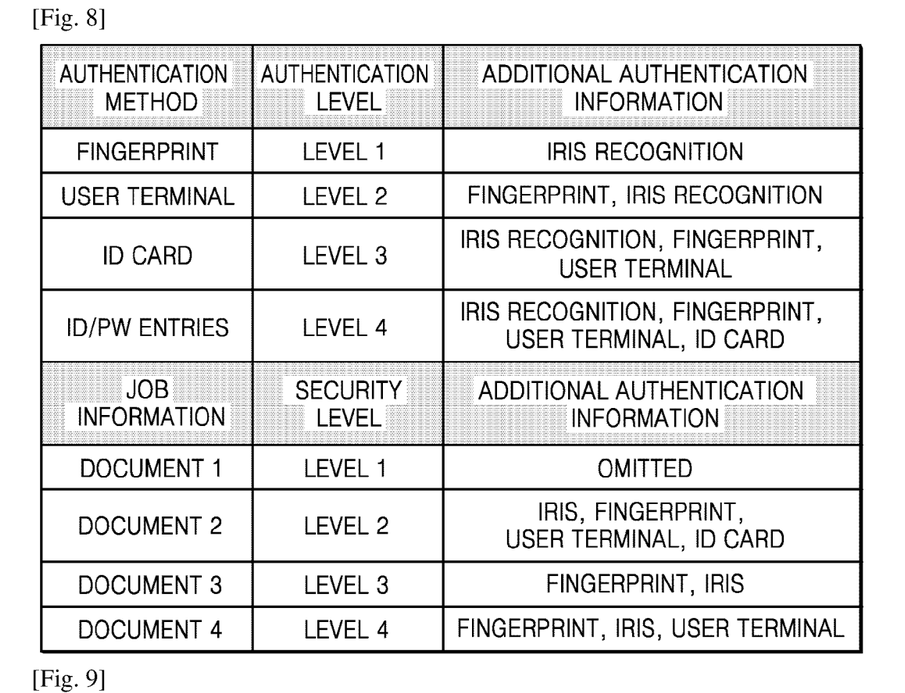
FIG. 8 is a diagram showing an authentication level and additional authentication information corresponding to a user authentication method according to an example.

FIG. 8 is a diagram showing an authentication level and additional authentication information corresponding to a user authentication method according to an example.

Referring to FIG. 8, the pull printing server 300 may determine additional authentication information based on user authentication information, user identification information, and a security level of a document.

According to an example, user authentication information may include information about a method by which a user inputs identification information via the image forming apparatus 100. For example, the user authentication information may include information about fingerprint recognition, iris recognition, facial recognition, user terminal tagging, an ID card, ID/PW entries, etc. The method by which a user inputs identification information is not limited. User authentication information input via the image forming apparatus 100 is transmitted to the pull printing server 300, and the pull printing server 300 may check user identification information corresponding to the user authentication information, job information stored by the user, job Information desired by the user, etc. The user identification information may include an employee number, a name, a telephone number, an address, ID/PW, a work department of the user, etc.

The user may input user authentication information to the image forming apparatus 100 by installing and executing an application supporting pull printing on the user terminal 200, inputting user information, such as ID/PW of the user to be authenticated in the pull printing server 300, and performing NFC tagging on the image forming apparatus 100, scanning a QR code at the image forming apparatus 100, wirelessly accessing the image forming apparatus 100 (e.g., via BLE), etc.

When user authentication information input via the user terminal 200 is input to the image forming apparatus 100, a job list request may be transmitted to the pull printing server 300 together with device information about the image forming apparatus 100 and user authentication information.

The pull printing server 300 may set an authentication level according to user authentication information. For example, a fingerprint authentication may be set to level 1, a user terminal authentication may be set to level 2, an ID card authentication may be set to level 3, and ID/PW entries may be set to level 4. Authentication levels may be mapped according to user authentication information and stored in the pull printing server 300 in advance.

The pull printing server 300 may determine additional authentication information by using initially input user authentication information. For example, the pull printing server 300 may determine additional authentication information by using basic authentication information together with a security level of a job requested by a user.

The pull printing server 300 may determine additional authentication information in consideration of an authentication level of user authentication information. For example, when user authentication information input via the image forming apparatus 100 is an ID card (level 3), additional authentication information may be designated as iris recognition, fingerprint recognition, or user terminal tagging. Furthermore, when user authentication information input via the image forming apparatus 100 is a fingerprint (level 1), fingerprint recognition of the same authentication level or iris recognition may be requested as additional authentication information.

The pull printing server 300 may determine additional authentication information in consideration of information about the image forming apparatus 100. For example, when the image forming apparatus 100 does not support a fingerprint input method, additional authentication information may be determined without the fingerprint input method.

Furthermore, the pull printing server 300 may determine additional authentication information by considering a security level set with respect to a job together with user authentication information. For example, when a level 5 document is selected after level 3 user authentication information is authenticated, "iris and fingerprint", which are acknowledged as common to both "iris, fingerprint, and user terminal" corresponding to level 3 user authentication information and "iris and fingerprint" corresponding to level 5 user authentication information, may be determined as additional authentication information. In such an example, the pull printing server 300 may request fingerprint recognition or iris recognition as additional authentication information.

Figure 9:
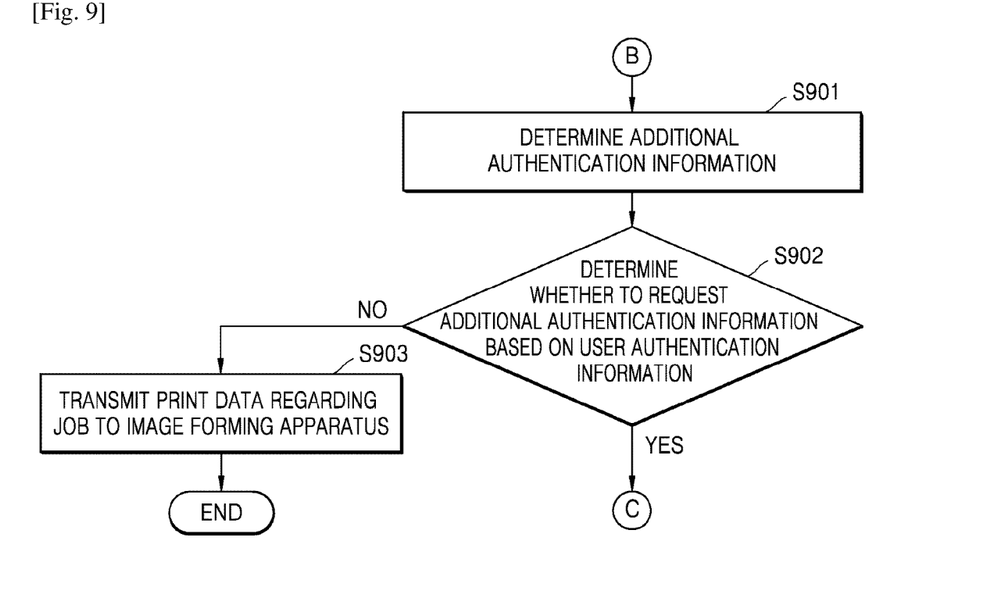
FIG. 9 is a diagram for describing an operation for determining whether to omit additional authentication information depending on user authentication information according to an example.

FIG. 9 is a diagram for describing an operation for determining whether to omit additional authentication information depending on user authentication information according to an example.

Referring to FIG. 9, the pull printing server 300 may determine additional authentication information by considering user identification information, information about the image forming apparatus 100, a security level set with respect to a job together, and user identification information.

In operation S901, the pull printing server 300 may determine additional authentication information. The pull printing server 300 may determine additional authentication information in consideration of the user authentication information, information about the image forming apparatus 100, and a security level set with respect to a job.

In operation S902, the pull printing server 300 may determine whether to request additional authentication information based on the user identification information. For example, when it is determined that additional authentication information is not necessary according to the user identification information, the pull printing server 300 may transmit print data to the image forming apparatus 100 in operation S903.

Furthermore, when it is determined that additional authentication information is necessary based on the user identification information, the pull printing server 300 may transmit a message indicating that additional authentication is necessary to a job list display device. The user identification information may include a user's ID, an employee number, the user's rank information, and the user's work department information. The pull printing server 300 may determine whether to request additional authentication information based on whether the user identification information meets criteria for accessing a selected job.

According to an example, when the pull printing server 300 determines that additional authentication information is not necessary based on the user identification information even after a fingerprint is determined as additional authentication information, the pull printing server 300 may transmit print data for the selected job to the image forming apparatus without requesting additional authentication information.

Figure 10:
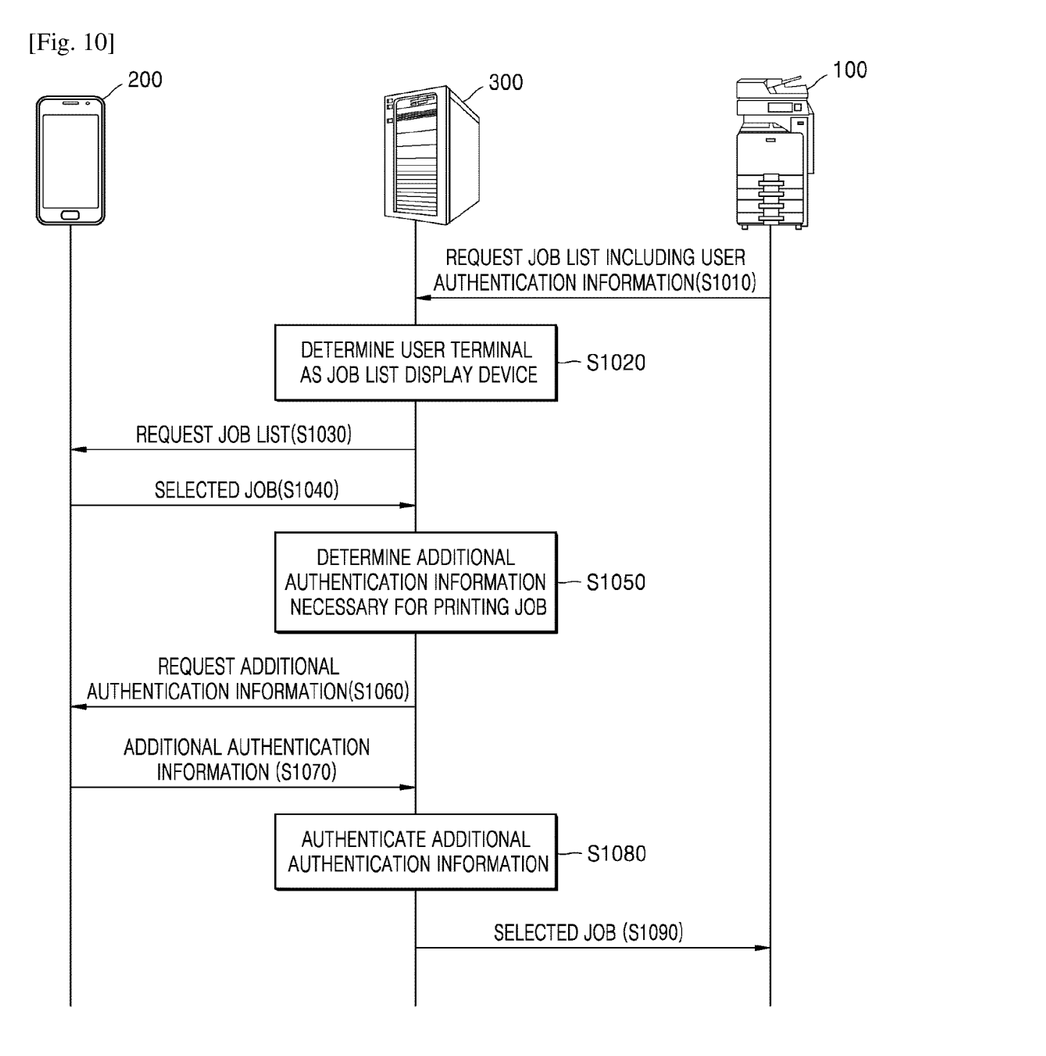
FIG. 10 is a diagram showing a method of performing additional authentication in a pull printing system by using a user terminal according to an example.

FIG. 10 is a diagram showing a method of performing additional authentication in a pull printing system by using a user terminal according to an example.

Referring to FIG. 10, the pull printing server 300 may receive a job list request including user authentication information from the image forming apparatus 100 in operation S1010. At this time, the pull printing server 300 may receive information about the image forming apparatus 100 as well.

In operation S1020, the pull printing server 300 may determine the user terminal 200 as a job list display device based on the user authentication information. The pull printing server 300 may determine a device mapped to the user authentication information in advance as the job list display device. For example, when ID/PW are entered via the image forming apparatus 100, the pull printing server 300 may determine the user terminal 200 as the job list display device.

In operation S1030, the pull printing server 300 may transmit a job list to the user terminal 200. The pull printing server 300 may transmit a job list including at least one job corresponding to the user identification information to the user terminal 200 based on the user authentication information.

In operation S1040, the pull printing server 300 may receive a request from the user terminal 200 for a job selected from the job list.

In operation S1050, the pull printing server 300 may determine additional authentication information necessary to print the selected job. The pull printing server 300 may determine additional authentication information by using at least one of the information about the image forming apparatus 100, user identification information, the user identification information, and a security level of the selected job.

In operation S1060, when an authentication method using the user terminal 200 is determined as additional authentication information, the pull printing server 300 may request additional authentication information to the user terminal 200.

In operation S1070, the pull printing server 300 may receive additional authentication information from the user terminal 200.

In operation S1080, the pull printing server 300 may determine whether the additional authentication information received from the user terminal 200 is identical to authentication information stored in advance.

In operation S1090, when authentication of the additional authentication information is completed, the pull printing server 300 may transmit the selected job to the image forming apparatus 100. The image forming apparatus 100 may print the received job.

Figure 11:
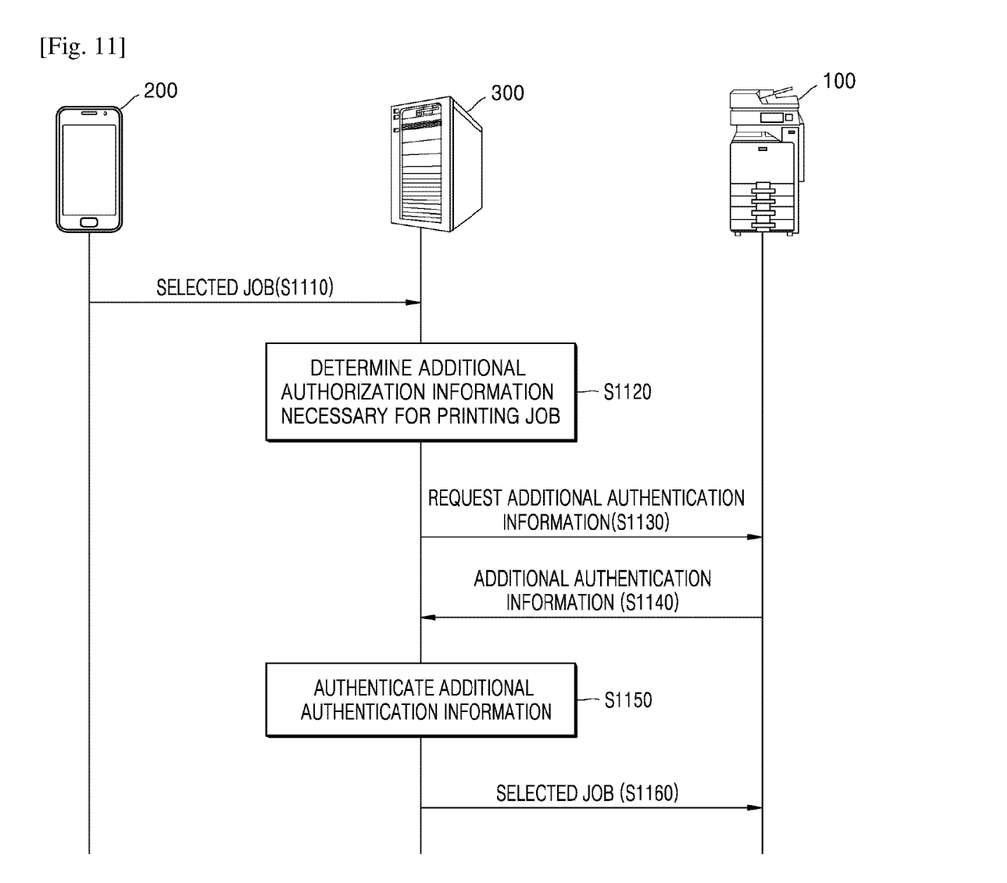
FIG. 11 is a diagram showing a method of performing additional authentication in a pull printing system by using an image forming apparatus according to an example.

FIG. 11 is a diagram showing a method of performing additional authentication in a pull printing system by using an image forming apparatus according to an example.

Referring to FIG. 11, the pull printing server 300 may provide a job list to a user terminal 200 and receive a request for a selected job from the user terminal 200 in operation S1110.

In operation S1120, the pull printing server 300 may determine additional authorization information necessary to print a job. The pull printing server 300 may determine from which of the image forming apparatus 100 and the user terminal 200 to request additional authentication information.

In operation S1130, the pull printing server 300 may request additional authentication information to the image forming apparatus 100. For example, the pull printing server 300 may additionally request a user fingerprint to the image forming apparatus 100.

In operation S1140, the pull printing server 300 may receive additional authentication information from the image forming apparatus 100. For example, the pull printing server 300 may receive user fingerprint information input by a user via the image forming apparatus 100.

At operation S1150, the pull printing server 300 may authenticate additional authentication information. For example, the pull printing server 300 may determine whether a user fingerprint received from the image forming apparatus 100 matches a user fingerprint registered in advance.

In operation S1160, the pull printing server 300 may transmit the selected job to the image forming apparatus 100 as a result of the authentication of the additional authentication information.

Figure 12:
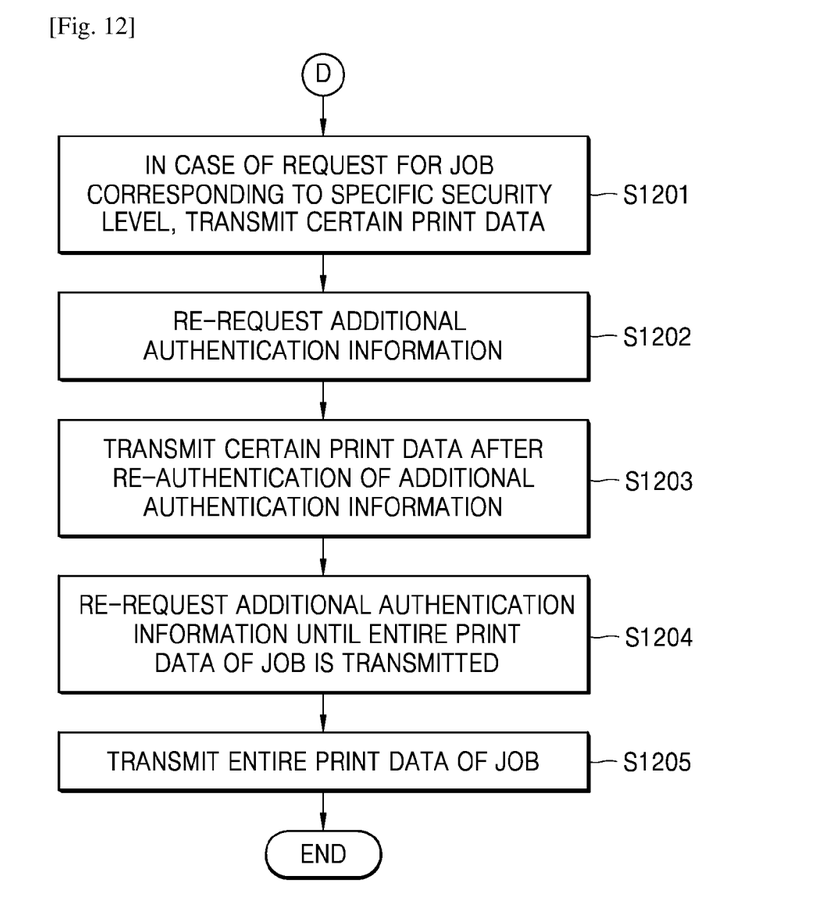
FIG. 12 is a diagram for describing an operation for re-requesting additional authentication information according to a security level of a job according to an example.

FIG. 12 is a diagram for describing an operation for re-requesting additional authentication information according to a security level of a job according to an example.

Referring to FIG. 12, the pull printing server 300 may periodically request additional authentication information when a security level of a job corresponds to a specific security level.

In operation S1201, the pull printing server 300 may transmit certain print data to the image forming apparatus 100 when a job of which additional authentication information is authenticated corresponds to a specific security level. For example, the certain print data may refer to a certain amount of print data or a certain number of pages of print data.

In operation S1202, the pull printing server 300 may request additional authentication information to the image forming apparatus 100 or the user terminal 200 after the certain print data is transmitted. The additional authentication information to be rerequested may be identical to or different from the initial additional authentication information.

In operation S1203, the pull printing server 300 may receive additional authentication information, re-authenticate the additional authentication information, and transmit certain print data. The certain print data transmitted here is not identical to the certain print data transmitted previously. For example, the pull printing server 300 may initially transmit print data corresponding to pages 1 through 10, re-authenticate additional authentication information, and transmit print data corresponding to pages 11-20.

In operation S1204, the pull printing server 300 may request additional authentication information until the entire print data for the job is transmitted. For example, when the selected job includes 60 pages to print and 10 pages are transmitted to the image forming apparatus 100 for each authentication, the pull printing server 300 may request additional authentication information total 6 times.

In operation S1205, the pull printing server 300 may transmit a remainder of the entire print data for the job to the image forming apparatus 100.

As a result, when a job selected by a user corresponds to a specific security level, it may be necessary to perform a plurality of authentication operations (e.g., at least three authentication operations), and thus the image forming apparatus 100 may perform pull printing with improved security.

The above-described examples may be embodied in the form of a computer-readable recording medium storing computer-executable instructions and data. At least one of the instructions and the data may be stored in the form of program codes and, when executed by a processor, a certain program module may be generated to perform a certain operation. Such computer-readable media may include read only memories (ROM), random access memories (RAM), flash memories, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, solid state disks (SSD), and any device capable of storing instructions or software, associated data, data files, and data structures and providing instructions or software, associated data, data files, and data structures to a processor or a computer, such that the processor or the computer executes instructions. For example, the computer-readable recording medium may be the memory 140 of the image forming apparatus 100 or the memory 114 of the user interface apparatus 110.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

The invention claimed is:

1. A pull printing server comprising:
   a communicator to receive, from an image forming apparatus, a job list request comprising user authentication information; and
   a controller to:
      select the image forming apparatus or a user terminal as a selected job list display device by using an authentication level corresponding to the user authentication information, wherein the selecting is based on mapping information that maps different authentication levels to respective different job list display devices, wherein the selecting comprises:
         selecting the image forming apparatus as the selected job list display device if the authentication level corresponding to the user authentication information in the job list request is a first authentication level mapped by the mapping information to the image forming apparatus, and
         selecting the user terminal as the selected job list display device if the authentication level corresponding to the user authentication information in the job list request is a second authentication level mapped by the mapping information to the user terminal, the second authentication level different from the first authentication level; and
      transmit a job list to the selected job list display device.

2. The pull printing server of claim 1, wherein the controller is to further:
   receive, from the selected job list display device, a request for a job selected from the job list displayed at the selected job list display device, and
   determine additional authentication information necessary for printing the job.

3. The pull printing server of claim 2, wherein the controller is to determine an additional authentication method common to an additional authentication method corresponding to a security level set with respect to the job and an additional authentication method corresponding to a security level of the user authentication information.

4. The pull printing server of claim 3, wherein the controller is to determine whether to request the determined additional authentication information by using user information.

5. The pull printing server of claim 2, wherein the controller is to transmit a message notifying the selected job list display device about additional authentication.

6. The pull printing server of claim 2, wherein the controller is to request the image forming apparatus or the user terminal, which is determined according to the determined additional authentication information, for the additional authentication information.

7. The pull printing server of claim 6, wherein the controller is to further:
   receive the requested additional authentication information from the image forming apparatus or the user terminal,
   authenticate the received additional authentication information, and
   in response to successful authentication of the received additional authentication information, transmit print data regarding the job to the image forming apparatus.

8. The pull printing server of claim 1, further comprising a storage to store at least one of information about a job with a set security level, information about the image forming apparatus, the user authentication information, or user identification information.

9. The pull printing server of claim 1, wherein the different authentication levels correspond to different types of authentication information.

10. The pull printing server of claim 9, wherein the different types of authentication information comprise at least two selected from among: fingerprint authentication information, iris recognition authentication information, facial recognition authentication information, identification card authentication information, and identification and password authentication information.

11. The pull printing server of claim 1, wherein the job list refers to a plurality of jobs stored at the pull printing server, and the transmitting of the job list to the selected job list display device is to cause a display, by the selected job list display device, of the jobs referred to by the job list.

12. A pull printing server comprising:
   a communicator to receive a job list request comprising user authentication information from an image forming apparatus; and
   a controller to:
      determine the image forming apparatus or a user terminal as a job list display device by using an authentication level corresponding to the user authentication information,
      transmit a job list to the job list display device,
      in response to receiving, from the job list display device, a request for a job selected from the job list, determine additional authentication information necessary for printing the job,
      request the image forming apparatus or the user terminal, which is determined according to the additional authentication information, for the additional authentication information,
      receive the requested additional authentication information from the image forming apparatus or the user terminal,
      in response to successful authentication of the received additional authentication information, transmit print data regarding the job to the image forming apparatus, and
      in response to a security level set with respect to the job corresponding to a specific security level, re-request the image forming apparatus or the user terminal for the additional authentication information, every time a certain unit of the print data regarding the job is transmitted.

13. The pull printing server of claim 12, wherein the certain unit of the print data comprises print data corresponding to a pre-set number of pages, and wherein the controller is to repeatedly re-request the additional authentication information until all pages of the print data regarding the job are transmitted to the image forming apparatus.

14. A pull printing method using a pull printing server comprising a hardware processor, the pull printing method comprising:
  receiving a job list request comprising user authentication information from an image forming apparatus, the job list request requesting a job list referring to a plurality of jobs stored at the pull printing server;
  selecting the image forming apparatus or a user terminal as a selected job list display device by using an authentication level corresponding to the user authentication information, wherein the selecting is based on accessing mapping information using the authentication level, the mapping information mapping different authentication levels to respective different job list display devices;
  transmitting the job list to the selected job list display device to cause a display, by the selected job list display device, of the jobs referred to by the job list;
  receiving a request for a job selected from the job list displayed at the selected job list display device;
  determining additional authentication information necessary for printing the job;
  receiving, at the pull printing server, the additional authentication information;
  in response to successful authentication of the received additional authentication information, transmit, from the pull printing server, a first portion of print data regarding the job to the image forming apparatus; and
  in response to determining that a security level for the job corresponds to a specific security level, re-request the additional authentication information prior to transmitting a second portion of the print data to the image forming apparatus.

15. The pull printing method of claim 14, wherein the different authentication levels correspond to different types of authentication information.

16. The pull printing method of claim 15, wherein the different types of authentication information comprise at least two selected from among: fingerprint authentication information, iris recognition authentication information, facial recognition authentication information, and identification card authentication information.

17. A non-transitory computer readable storage medium comprising instructions that upon execution cause a pull printing server to:
  receive, at the pull printing server from an image forming apparatus, a job list request for a job list referring to a plurality of jobs, the job list request comprising user authentication information;
  select the image forming apparatus or a user terminal as a selected job list display device by using an authentication level corresponding to the user authentication information, wherein the selecting is based on accessing mapping information using the authentication level, the mapping information mapping different authentication levels to respective different job list display devices, wherein the selecting comprises:
    selecting the image forming apparatus as the selected job list display device if the authentication level corresponding to the user authentication information in the job list request is a first authentication level mapped by the mapping information to the image forming apparatus, and
    selecting the user terminal as the selected job list display device if the authentication level corresponding to the user authentication information in the job list request is a second authentication level mapped by the mapping information to the user terminal, the second authentication level different from the first authentication level; and
  transmit the job list to the selected job list display device.

* * * * *